(12) United States Patent
Gebert

(10) Patent No.: US 6,872,304 B1
(45) Date of Patent: Mar. 29, 2005

(54) RING FILTER ELEMENT COMPRISING A PLUG FOR, IN PARTICULAR, A LUBRICATING OIL FILTER OF AN INTERNAL COMBUSTION ENGINE

(75) Inventor: Hans Gebert, Heilbronn (DE)

(73) Assignee: MAHLE Filtersysteme GmbH, Stuttgart (DE)

(*) Notice: Subject to any disclaimer, the term of this patent is extended or adjusted under 35 U.S.C. 154(b) by 363 days.

(21) Appl. No.: 10/130,564
(22) PCT Filed: Jul. 22, 2000
(86) PCT No.: PCT/DE00/02412
§ 371 (c)(1),
(2), (4) Date: May 17, 2002
(87) PCT Pub. No.: WO01/37967
PCT Pub. Date: May 31, 2001

(30) Foreign Application Priority Data

Nov. 20, 1999 (DE) .......................................... 199 55 864

(51) Int. Cl.$^7$ .......................... B01D 27/00; F01M 11/03
(52) U.S. Cl. ....................... 210/232; 210/430; 210/440; 210/DIG. 17
(58) Field of Search .............................. 210/168, 232, 210/248, 416.5, 429, 430, 433.1, 440, DIG. 17; 123/196 A

(56) References Cited

U.S. PATENT DOCUMENTS 5,902,479 A * 5/1999 Fukumori et al. .......... 210/248

FOREIGN PATENT DOCUMENTS

| DE | 8908917 | 12/1989 |
|----|---------|---------|
| DE | 3903675 | 8/1990 |
| DE | 19612689 | 6/1997 |
| DE | 19737699 | 3/1999 |
| EP | 0839563 | 5/1998 |

* cited by examiner

Primary Examiner—Robert James Popovics
(74) Attorney, Agent, or Firm—Collard & Roe, P.C.

(57) ABSTRACT

A ring filter element comprising a plug for, in particular, a lubricating oil filter of an internal combustion engine. Said ring filter element is provided for insertion into a filter housing comprising a filter housing pot and a filter cover that can be axially detached. When inserted in the closed filter housing, the plug seals an opening which is provided in the filter housing pot and which extends in the same axial direction as the plug. The aim of the invention is to provide a ring filter element of the aforementioned type that can be packed in a space-saving manner. To this end, the ring filter element comprises the following characteristics: the plug is mounted on the ring filter element in such a manner that it can be displaced along to same axis or parallel to the axis, and; said mounting permits the plug to move with the aid of an actuating means which acts, by contact, upon the lug from outside the ring filter element.

9 Claims, 2 Drawing Sheets

Figure 1:
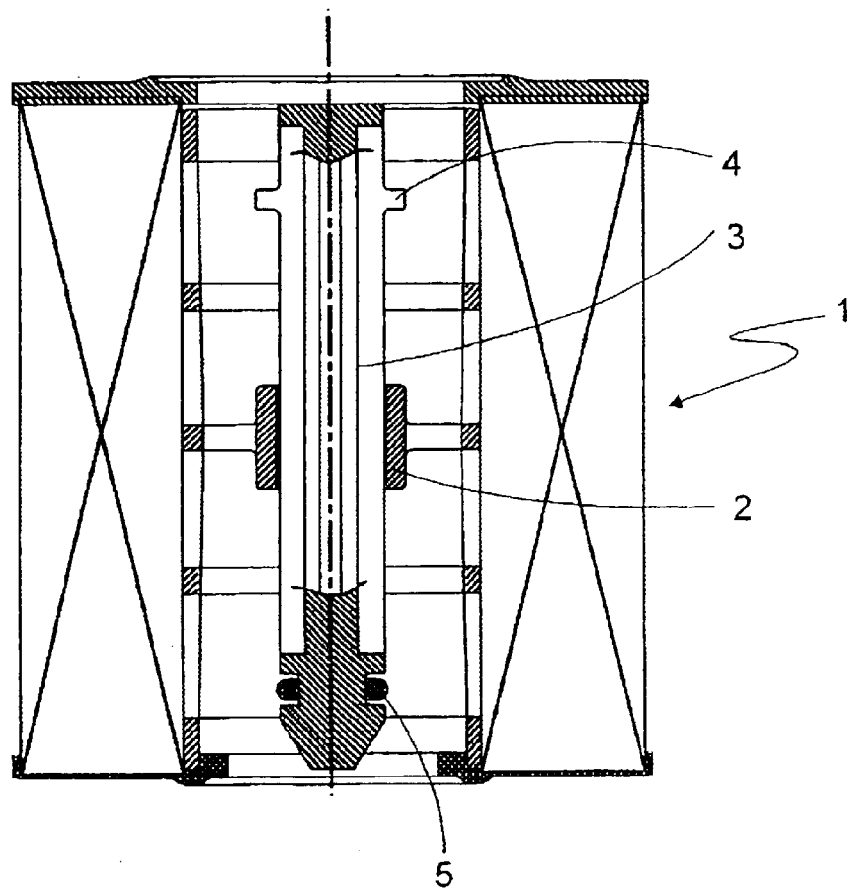

RING FILTER ELEMENT COMPRISING A PLUG FOR, IN PARTICULAR, A LUBRICATING OIL FILTER OF AN INTERNAL COMBUSTION ENGINE

CROSS REFERENCE TO RELATED APPLICATIONS

Applicants claim priority under 35 U.S.C. §119 of GERMAN Application No. 199 55 864.7 filed on 20 Nov. 1999. Applicants also claim priority under 35 U.S.C. 365 of PCT/DE00/02412 on 22 Jul. 2000. The international application under PCT article 21(2) was not published in English.

The invention relates to a ring filter element according to the precharacterising part of claim 1.

Such a filter is for example known from DE 39 03 675 C2.

With generic ring filter elements there are cases where, when the ring filter element is in place in a filter housing, the stopper plug has to protrude from the axial end of the ring filter element. In such cases, for packaging a ring filter element which has not yet been inserted into a filter housing, a packaging volume increased by the distance by which the stopper plug protrudes is necessary, when compared to such a ring filter element in which no stopper plug protrudes beyond one of the axial ends of the ring filter.

In the case of a generic ring filter element, the invention deals with the problem of keeping the packaging volume of a ring filter element (in which, in the state in which it is inserted in the filter housing, the stopper plug has to axially protrude from the ring filter element) equal to the volume that would be possible in a ring filter element without a protruding stopper plug.

This object is met by shaping the ring filter element according to the characteristic features of claim 1.

Advantageous embodiments of the invention are contained in the subordinate claims 11–16.

Claims 8 and 9 disclose the characteristics of a filter housing associated with the ring filter element according to the invention. Overall, the design of the ring filter element according to the invention is based on the idea of slidably holding the stopper plug in said element such that said stopper plug, with the ring filter element not yet completely inserted into the filter housing, is completely insertable between the axial ends of said ring filter element. By contrast, in the state where the ring filter element is inserted in the filter housing, said stopper plug is automatically pushed to a closed position by the closed cover of the filter housing. In said closed position, the stopper plug axially protrudes from the ring filter element. To prevent any possibility of the stopper plug falling out of a ring filter element that has not yet been inserted into a filter housing, the sliding path is limited by end stops provided on the stopper plug. One of these two end stops can be formed by a mounted ring seal which in the case of a stopper plug serves as a closure element for the aperture to be sealed off in the filter housing barrel. In this way the stopper plug can easily be installed in that the sealing ring is mounted, by way of a sliding path end stop, only after inserting the stopper plug into its bearing seat starting from the ring element.

The drawing shows an advantageous embodiment of the invention.

Figure 2:
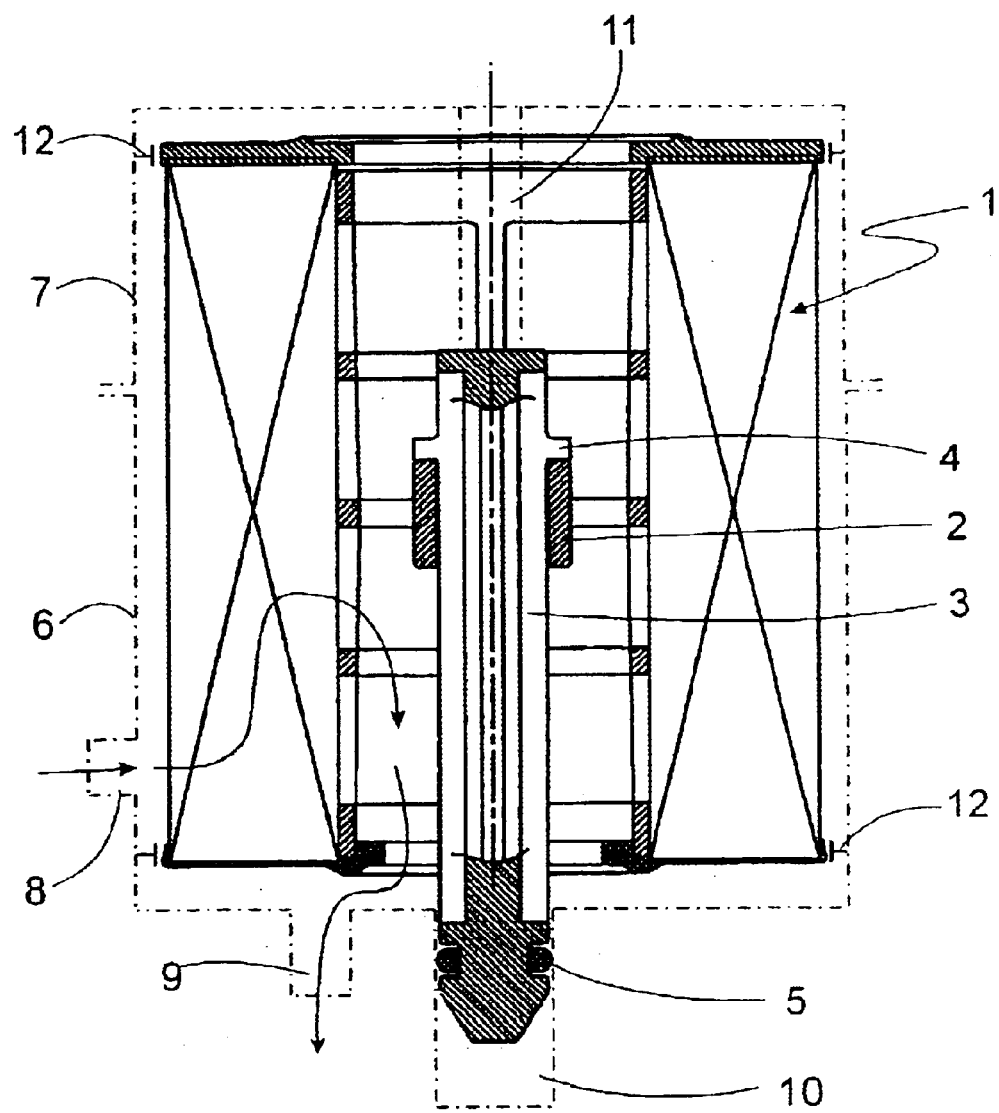

The following are shown:

FIG. 1 a section of a ring filter element not yet inserted in a filter housing; and FIG. 2 the ring filter element in a state inserted in a filter housing (shown by a dot-dash line).

DESCRIPTION OF FIG. 1

In a ring filter element 1, in a bearing ring 2, a stopper plug 3 is slidably held so as to be aligned along the same axis as the ring filter element 1. The sliding path is delimited by fixed end stops 4 on one end, and by a sealing ring 5 on the other end.

The sealing ring 5 serves as a sealing closure element in that region of the stopper plug 3 in which said stopper plug 3 engages the aperture of a filter housing barrel, which aperture is to be sealed off. From the point of view of axial alignment, the stopper plug 3 is completely within the ring filter element.

DESCRIPTION OF FIG. 2

In this figure, the stopper plug 3 is in the position which it assumes if the ring filter element 1 is inserted into a filter housing which comprises a filter housing barrel 6 with a sealed-off filter cover 7 in place. The medium to be filtered enters the filter housing barrel 6 through an inlet aperture 8, flows through the ring filter element 1 in the direction indicated by arrows, before subsequently leaving the filter housing barrel 6 through the drain aperture 9. In order to create separate chambers for cleaned media and for raw media, the ring filter element 1 is sealed off against the filter housing by seals 12. With its closure region, the stopper plug 3, which axially protrudes from the ring filter element 1 and carries the sealing ring 5 as a closure element, seals off a discharge aperture 10 which has been additionally provided in the filter housing barrel 6.

The stopper plug 3 has been pushed into the closure position by means of an end stop element 11 provided in the filter cover 1, said end stop element 11 keeping the stopper plug 3 locked in the closed position when the filter housing is closed.

When the filter cover is open, the stopper plug 3 is no longer locked so that it is again freely movable and can be withdrawn from the discharge aperture 10 when the ring filter element 1 is removed from the filter housing barrel.

The stopper plug 3 can be connected to the filter cover 7 by way of a latch-type or snap-type closure. The unlocking force within the latch-type or snap-type closure may exceed the force necessary to pull the stopper plug 3 over the sealing ring 5 through the bearing ring 2. In such a design of the latch-type or snap-type closure, the stopper plug 3 could remain on the lid 7 when the ring filter element 1 is removed.

Usually, at the latest when the filter housing is closed, the ring filter element 1 is disconnectably connected to the filter cover 7. The release force is designed such that when the filter cover 7 is opened, i.e. when it is removed from the filter housing barrel, the ring filter element 1 is automatically carried along, with said ring filter element then being able to be removed from said filter housing barrel when the filter cover 7 is completely removed. In such a case, the end stops 4 in a ring filter element 1 according to the invention have to be made on the stopper plug 3 such that when the filter housing is closed, said end stops 4 are extremely close to the bearing ring 2. Only then can it be ensured that at the same time as withdrawal of the filter element 12, which is carried out by the cover 7, the closure part of the stopper plug 3 too, is withdrawn from the aperture 10 to be sealed off in the filter housing barrel 6. Such simultaneous withdrawal of the stopper plug 3 together with the ring filter element 1 is important in those cases where the aperture to be closed off by the stopper plug 3 should already be open prior to completely opening the filter cover 7.

What is claimed is:

1. A ring filter element with a stopper plug, in particular for a lubricating oil filter of a combustion engine, for insertion into a filter housing with a filter housing barrel and an axially removable filter cover, in which the stopper plug in the state inserted into the closed filter housing, closes off an aperture which exists in the filter housing barrel, said aperture being aligned along the same axis as the stopper plug, wherein the stopper plug (3) is held on the ring filter element (1) so as to be aligned along the same axis as said ring filter element (1) or parallel to said ring filter element (1), so as to be slidable within the ring filter element;

the holding arrangement makes it possible to slide the stopper plug (3) by means of an actuating means (11) which acts upon said stopper plug (3) by contact, from outside the ring filter element (1).

2. The ring filter element according to claim 1, wherein in the state in which it is not inserted into a filter housing, the stopper plug (3) can be completely slid into a space which is situated between the axial ends of the ring filter element (1).

3. The ring filter element according to claim 1, wherein the stopper plug (3) is held in the center of the ring filter element (1).

4. The ring filter element according to claim 1, wherein the sliding path of the stopper plug (3) is delimited on both sides.

5. The ring filter element according to claim 1, wherein the stopper plug (3) is bolt shaped, comprising a center part which is slidably held in a bearing ring (2) of the ring filter element (1);

a first end comprising a closure element (5); and a second end for engagement by said actuating means (11) which causes sliding.

6. The ring filter element according to claim 1, wherein the closure element is a sealing ring (5) which provides a radial seal.

7. The ring filter element according to claim 1, wherein the sealing ring (5) serves as a delimitation of the sliding path, which delimitation is effective in one direction of the sliding path.

8. The filter housing with a filter housing barrel and an axially removable cover for a ring filter element according to claim 1, wherein in the filter cover (7) said actuating means (11) is provided, which, during closing of the filter cover (1), causes the stopper plug (30) to slide.

9. The filter housing according to claim 8, wherein in its closed state the actuating means (11) provided in the filter cover (7) for sliding the stopper plug (3), keeps the plug (3) locked in its closed position, while this locking action is cancelled when the filter cover (7) is open.

* * * * *